(12) United States Patent  (10) Patent No.: US 7,891,690 B2
Bryce  (45) Date of Patent: Feb. 22, 2011

(54) TRAILER HITCH

(76) Inventor: Norman K. Bryce, 3610 S. 2700 East, Salt Lake City, UT (US) 84109

( * ) Notice: Subject to any disclaimer, the term of this patent is extended or adjusted under 35 U.S.C. 154(b) by 0 days.

(21) Appl. No.: 12/211,725

(22) Filed: Sep. 16, 2008

(65) Prior Publication Data

US 2009/0008905 A1 Jan. 8, 2009

Related U.S. Application Data

(63) Continuation-in-part of application No. 11/592,929, filed on Nov. 3, 2006, now Pat. No. 7,425,011.

(51) Int. Cl.
B60D 1/32 (2006.01)
B60D 1/44 (2006.01)
B60D 1/40 (2006.01)

(52) U.S. Cl. ................. 280/455.1; 280/446.1; 280/447; 280/478.1

(58) Field of Classification Search ............. 280/446.1, 280/447, 455.1, 456.1, 478.1, 479.1, 499
See application file for complete search history.

(56) References Cited

U.S. PATENT DOCUMENTS

| 1,438,831 A | 12/1922 | Jones |
| 1,918,382 A | 7/1933 | Cook |
| 2,025,820 A | 12/1935 | Miller |
| 2,036,993 A | 4/1936 | Allen |
| 2,092,597 A | 9/1937 | Benjamin |
| 2,144,295 A | 1/1939 | Mcgregor |
| 2,414,248 A | 1/1947 | Townsend |
| 2,768,837 A | 10/1956 | Prater |
| 2,788,226 A | 4/1957 | Malone |
| 2,792,238 A * | 5/1957 | Schaa .......................... 280/458 |
| 2,879,079 A | 3/1959 | Edwards |
| 2,947,551 A | 8/1960 | Reimers |
| 3,101,959 A * | 8/1963 | Adams ........................ 280/432 |
| 3,487,448 A | 12/1969 | Stemmerman et al. |
| 3,556,558 A | 1/1971 | Mckee |
| 3,572,750 A * | 3/1971 | Derr, Jr. .................... 280/455.1 |
| 3,787,068 A | 1/1974 | Miller |
| 4,019,754 A | 4/1977 | Hinckley |
| 4,060,255 A | 11/1977 | Zimmerman |
| 4,343,484 A * | 8/1982 | Van Antwerp ............... 172/272 |
| 4,398,617 A | 8/1983 | Crabb |

(Continued)

Primary Examiner—Lesley Morris
Assistant Examiner—Daniel Yeagley
(74) Attorney, Agent, or Firm—Thorpe North & Western LLP

(57) ABSTRACT

A trailer hitch for a vehicle includes an attachment bar and post for attaching the hitch to a vehicle and a base suspended from the attachment post to allow limited lateral movement of the base with respect to the attachment. A universal pivot connector, such as a hitch ball, is mounted on the base to move with the base for mating connection to a tongue of a trailer to be connected to the vehicle. The trailer tongue is biased against rotational movement with respect to the pivot connector whereby the allowed lateral movement of the suspended base and the pivot connector and the resistance to rotational movement of the trailer tongue with respect to the pivot connector combine to move the effective pivot point of the tongue on the universal pivot connector approximately to the center of the rear axle of the towing vehicle to simulate the towing movement of a fifth wheel trailer hitch.

20 Claims, 10 Drawing Sheets

U.S. PATENT DOCUMENTS

| | | |
|---|---|---|
| 4,420,169 A | 12/1983 | Taylor |
| 4,575,110 A | 3/1986 | Kuhn et al. |
| 4,722,542 A | 2/1988 | Hensley |
| 4,781,394 A * | 11/1988 | Schwarz et al. ............. 280/477 |
| 5,167,423 A | 12/1992 | Hall, Jr. |
| 5,516,139 A * | 5/1996 | Woods ....................... 280/477 |
| 5,660,409 A | 8/1997 | Hensley |
| 5,941,550 A * | 8/1999 | Szczypski ................ 280/479.2 |
| 5,975,553 A * | 11/1999 | Van Vleet ................... 280/483 |
| 6,073,953 A | 6/2000 | Kendall |
| 6,305,705 B1 | 10/2001 | Cook |
| 6,902,181 B1 * | 6/2005 | Dye ........................ 280/478.1 |
| 7,134,679 B2 | 11/2006 | Krstovic |

* cited by examiner

TRAILER HITCH

PRIORITY CLAIM

This application is a Continuation-in-Part of U.S. patent application Ser. No. 11/592,929 filed Nov. 3, 2006, now U.S. Pat. No. 7,425,011, which is incorporated herein by reference in its entirety for all purposes.

BACKGROUND OF THE INVENTION

1. Field of the Invention

The invention is in the field of trailer hitches.

2. Related Art

Trailer hitches generally used with automobiles and small trucks are usually attached to the rear frame of the towing vehicle with a universal pivot attachment, such as a ball, spaced behind the towing vehicle to pivotally receive thereon a mating attachment, such as a socket, on a tongue extending from the body of the trailer to be towed. This allows easy attachment of the trailer to the towing vehicle and provides good tracking of the trailer around corners and curves negotiated by the towing vehicle.

One problem in towing a trailer is fishtailing. Fishtailing is side to side turning and swaying of the trailer with the trailer pivoting about its pivot connection to the vehicle behind the vehicle. Fishtailing happens primarily with systems having the pivot point of the hitch located behind the towing vehicle between the trailer and the towing vehicle. As the trailer moves from side to side of the towing vehicle, it puts side to side or lateral forces on the pivot connection between the towing vehicle and the trailer. With the attachment of the hitch to the rear of the towing vehicle body, this tends to cause the rear of the towing vehicle body to start to move or sway from side to side which can lead to loss of control of the vehicle. This side to side swaying of the trailer is a cyclic motion that can increase in frequency and magnitude as the vehicle pulls the trailer until ultimately the side to side swaying is too great for the towing vehicle to handle which results in a loss of control of the towed trailer and the towing vehicle.

Moving the effective pivot point between the trailer and the towing vehicle to the center of the rear axle of the towing vehicle usually eliminates most of the fishtailing. It is difficult to move or sway a vehicle body to the side in relation to the axles of the vehicle with a side force applied over an axle or over tandem axles. However, it is easier to sway a vehicle body to the side when the side force is applied at the front or rear of the body. A fifth wheel trailer attachment moves the actual pivot point between the trailer and vehicle directly over the rear axle of the towing vehicle and provides better stability for the vehicle and trailer combination. However, fifth wheel hitches are not practical for towing trailers with automobiles and small trucks.

Attempts have been made to move the pivot point of a trailer hitch to the rear axle of the towing vehicle. For example, some trailers have a hitch attached to the rear axle of a towing vehicle with a drawbar pivotally attached adjacent the rear axle. The drawbar is attached to the trailer in a manner to prevent pivotal movement between the drawbar and the trailer with all pivotal movement occurring at the pivotal mounting of the drawbar adjacent the rear axle of the towing vehicle. While this type of trailer hitch is effective in reducing fishtailing and providing more stability to the vehicle-trailer combination, it has the disadvantage that the tracking of the trailer is changed so that the trailer turns a shorter radius than the rear of the vehicle so it cuts corners.

Most vehicles on roads, highways, and freeways steer by turning the front wheels of the vehicle. The natural geometry of this steering system causes the rear wheels of the vehicle to track inside the radius of the curve paths of the front wheels. With a trailer pivoted to the towing vehicle adjacent the rear axle, the trailer will track significantly inside the tracks of the rear wheels of the vehicle. The true tracking pivot point for a trailer is midway between the towing vehicle rear wheels and the trailer wheels. Therefore, for tracking purposes, it is advantageous to maintain the trailer pivot point behind the towing vehicle. Also, with the hitch attached to the rear axle of the towing vehicle, the drawbar has to be supported vertically, either by attachment to the rear of the vehicle or to the trailer tongue, so that the trailer connection does not drag on the ground. Further, the rigid attachment of the drawbar to the trailer tongue makes attaching and detaching of the trailer more difficult.

Several trailer hitches have been designed to keep the connection between the towing vehicle and the trailer behind the towing vehicle as with the conventional hitch to provide similar tracking of the trailer and ease of attaching the trailer. These hitches also attempt to move the effective pivot point forwardly of the rear of the towing vehicle toward the towing vehicle axle. These hitches generally do not allow any pivotal movement of the trailer tongue about the point of connection to the towing vehicle, although at least one of these hitches allows free pivotal movement of the trailer tongue about the point of connection as with the usual ball and socket connection.

SUMMARY OF THE INVENTION

The invention provides a trailer hitch for a vehicle including an attachment means for attaching the hitch to a vehicle. A base is suspended from the attachment means to allow lateral movement of the base with respect to the attachment means. A universal pivot connector extends upward from the base to provide a mating connection for the trailer tongue that moves with the base. A pair of overlapping pivot plates are mounted to pivot about the universal pivot connector in coordination with the trailer tongue when the trailer tongue is in a mating position with the pivot connector. Each of the pivot plates includes a flange to interact with the trailer tongue when the trailer tongue is in a mating position with the universal pivot connector such that as the trailer tongue pivots about the universal pivot connector the trailer tongue contacts at least one of the flanges to move at least one of the pivot plates with respect to the attachment means. A biasing device is coupled to each of the pair of overlapping pivot plates to bias each of the pivot plates to a preset position with respect to the base and to resist rotation of the pivot plates and trailer tongue away from the preset position.

Additional features and advantages of the invention will be apparent from the detailed description which follows, taken in conjunction with the accompanying drawings, which together illustrate, by way of example, features of the invention.

BRIEF DESCRIPTION OF THE DRAWINGS

In the accompanying drawings, which show the best mode currently contemplated for carrying out the invention.

DETAILED DESCRIPTION

Figure 1:
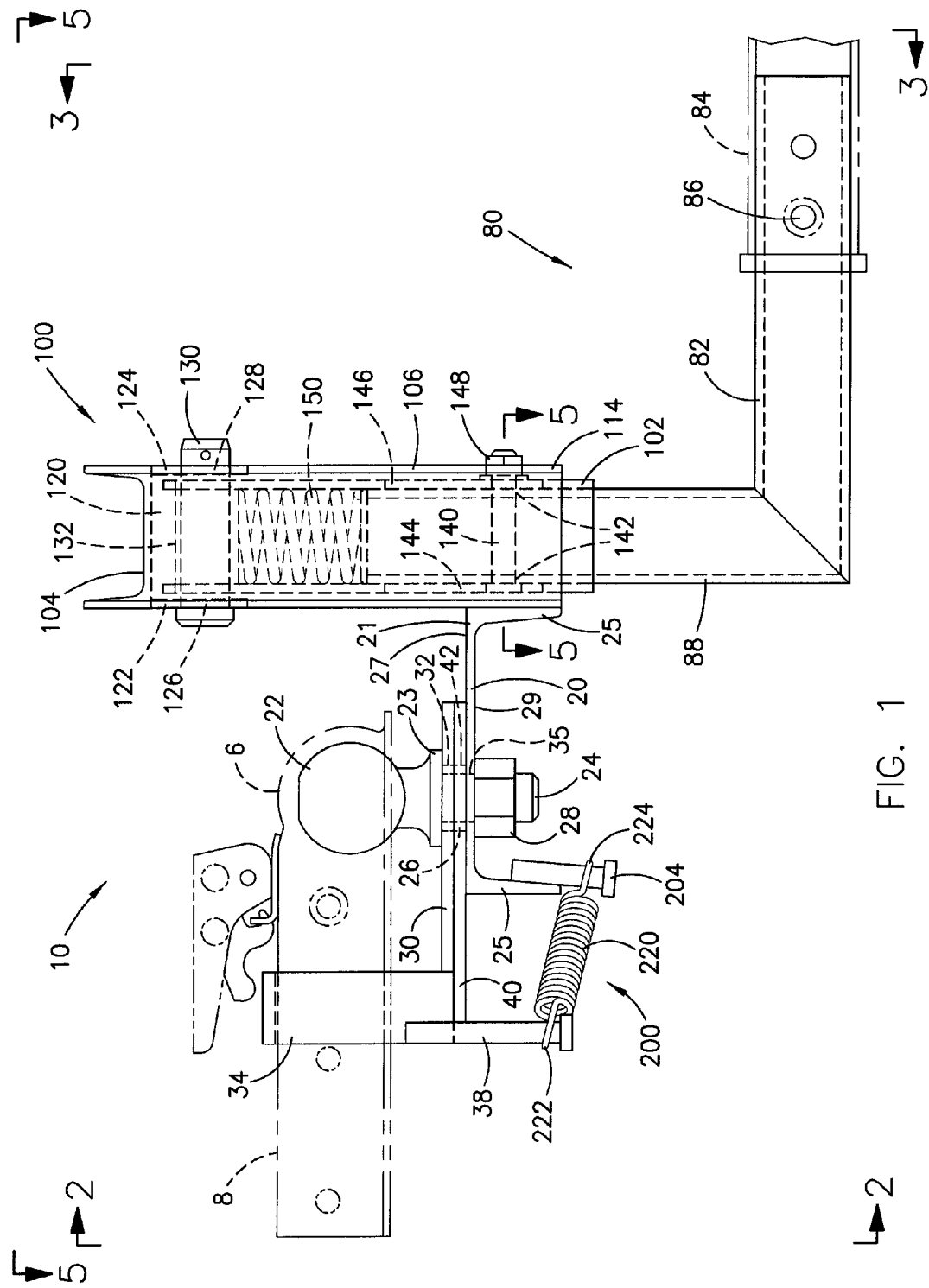
FIG. 1 is a side view of a trailer hitch in accordance with an embodiment of the present invention.

Reference will now be made to the exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of this disclosure, are to be considered within the scope of the invention.

Referring to the embodiment of FIGS. 1-5, a trailer hitch, indicated generally at 10, of the invention includes a base 20. Base 20 is a substantially flat plate 21 with two downwardly extending flanges 25 disposed on opposite sides of the base 20. The flate plate 21 has an upper surface 27 and a lower surface 29. The downwardly extending flanges 25 provide strength and attachment surfaces for the base 20.

A universal pivot connector in the form of the conventional trailer hitch ball 22 with ball base 23 is secured to base 20 by the usual threaded stud 24 extending from ball base 23 of hitch ball 22 and passing through a bushing 26 and receiving hole 35 in base 20. Bushing 26 spaces ball base 23 above base upper surface 27. A nut 28 is tightened against the lower surface 29 of base 20 to sandwich base 20 and bushing 26 between the nut 28 and the ball base 23 to secure hitch ball 22 to base 20. The tongue 8 of a trailer (not shown) to be towed fits on the ball 22 when the ball receiving socket 6 at the end of tongue 8 is coupled to the ball 22 in normal manner.

Base 20 is secured to a towing vehicle (not shown) through an attachment means, indicated generally at 80, secured to the rear portion of the towing vehicle. The illustrated attachment means 80 includes an attachment bar 82 adapted to be received in normal manner by the usual hitch receiver 84, FIG. 1, attached to the rear of a towing vehicle. Attachment bar 82 is held in hitch receiver 84 by pin 86 in normal manner. Hitch receiver 84 is normally aligned with the longitudinal center axis, indicated by dashed line at 90, FIG. 11, of the towing vehicle. Attachment bar 82 extends straight out of hitch receiver 84 rearwardly along the longitudinal center axis 90 of the towing vehicle.

The attachment means 80 also includes an upwardly extending post 88 that is coupled to and extends upward from the attachment bar 82. The upwardly extending post 88 is substantially perpendicular to the receiver bar 82. In this way, the upwardly extending post 88 is substantially vertical when the attachment bar 82 is substantially horizontal. Attachment bar 82 and upwardly extending post 88 are illustrated as made from square tubing, such as square steel tubing, that has a hollow interior.

The base 20 of the trailer hitch 10 is suspended from the attachment means 80 in a manner to allow limited lateral movement of the base 20 with respect to the attachment means 80 and with respect to the longitudinal centerline 90 of the towing vehicle. The base 20 includes a swing frame, indicated generally at 100, that is pivotally coupled to the upwardly extending post 88 of the attachment means 80. The swing frame 100 can swing laterally, or in a side-to-side direction, in relation to the towing vehicle. In this way, the swing frame 100 allows the base 20 and the hitch ball 22 to move together with the swing frame 100 in a lateral direction with respect to the towing vehicle.

Figure 5:
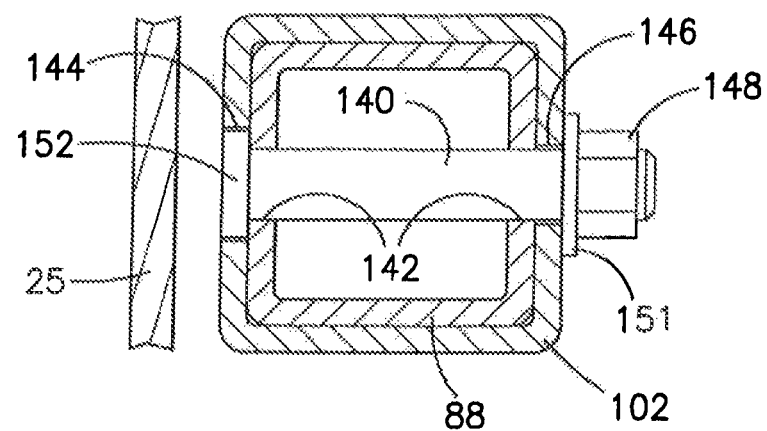
FIG. 5 is a cross section top view of an attachment means of the trailer hitch of FIG. 1.
Figure 8:
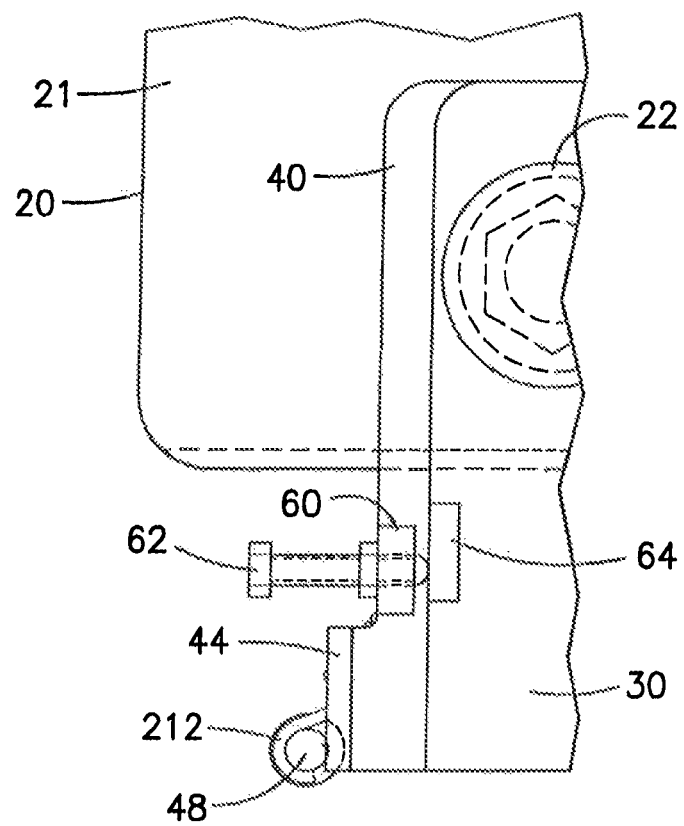
FIG. 8 is a fragmentary top view of the base and pivot plates of FIG. 6.

To mount the swing frame 100 to the attachment means 80, swing frame 100 includes a sleeve 102 that is sized and shaped to fit over and receive the upwardly extending post 88. In one aspect, the upwardly extending post 88 can be a metal square tube or rod, and the sleeve 102 can be a metal square tube similar in shape but larger in size than the upwardly extending post 88 so that the sleeve 102 can slide over the upwardly extending post 88. The flange 25 of the base 20 nearest the sleeve 102 is in a spaced apart position with respect to the sleeve 102 so that the base 20 does not interfere with the lateral motion of the swing frame 100, as shown in FIG. 5.

Returning to FIGS. 1-5, the swing frame 100 also includes a cross member 104 that is positioned at the top 89 of sleeve 102 when sleeve 102 is telescoped over the upwardly extending post 88. The cross member 104 crosses on top of sleeve 102 and sleeve 102 is positioned substantially at the center of the cross member 104. Two downwardly extending legs 106 are coupled to opposite ends 108 and 110 of the cross member 104, and extend downwardly from the cross member 104 to attach to base 20. The downwardly extending legs 106 are angled with respect to a vertical orientation, and angled outward from the vertical centerline 92 of the hitch 10 such that the distance D1, FIG. 2, between the bottoms of the downwardly extending legs 106 is larger than the distance D2, FIG. 2, between the top of the downwardly extending legs. The base 20 is coupled to and extends between the bottoms 114 and in front of the downwardly extending members 106. The cross member 104 and the downwardly extending legs 106 can be formed of a metal channel material, such as steel channel.

A pivot bracket 120 is coupled below the cross member 104 and between the downwardly extending legs 106. The pivot bracket 120 includes a front panel 122 and a rear panel 124.

The top of sleeve 102 is movably positioned between the front panel 122 and the rear panel 124. The front panel 122 has a hole 126 extending through the front panel 122 and the rear panel 124 has a corresponding hole 128 extending through the rear panel 124. The holes 126 and 128 are aligned such that a pivot pin 130 can slide through the holes. Additionally, sleeve 102 has a hole 132 extending through the sleeve. The sleeve hole 132 is aligned with the holes 126 and 128 in the front and rear panels and the pivot pin 130 pivotally secures the panels and hence the swing frame 100 to the sleeve 102. The holes 126 and 128 and the pivot pin 130 are located on the vertical central axis 92 of the attachment means 80, such that the pivot axis of the swing frame 100 is parallel to and vertically above the longitudinal center axis 90.

Figure 4:
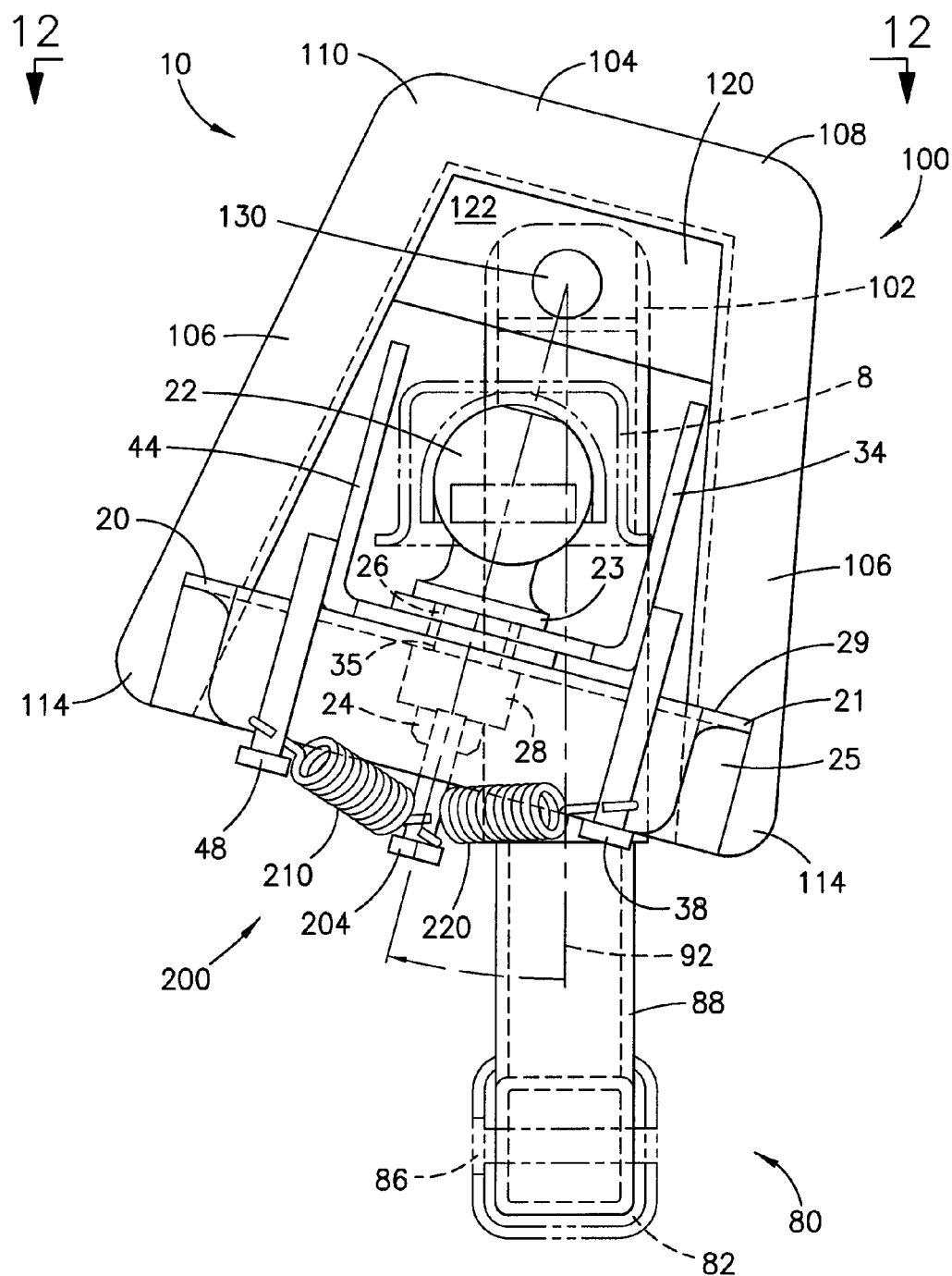
FIG. 4 is rear view of the trailer hitch of FIG. 1, and showing a base and hitch ball in a laterally offset position.
Figure 12:
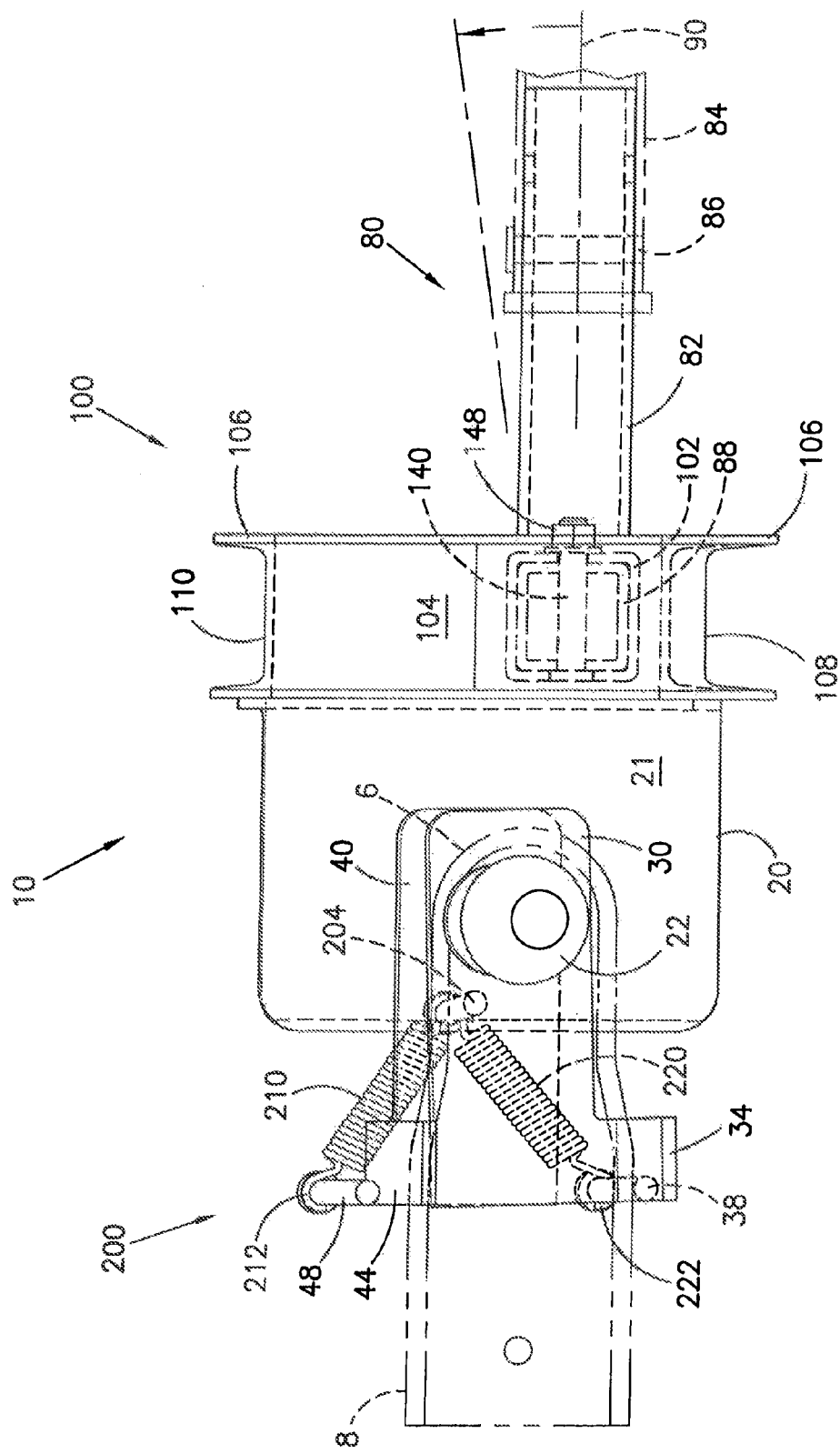
FIG. 12 is a top view similar to that of FIG. 11 of the trailer hitch of FIG. 1, with the base, universal pivot connector, and connection to the trailer tongue in a laterally offset position with respect to the attachment means.
Figure 13:
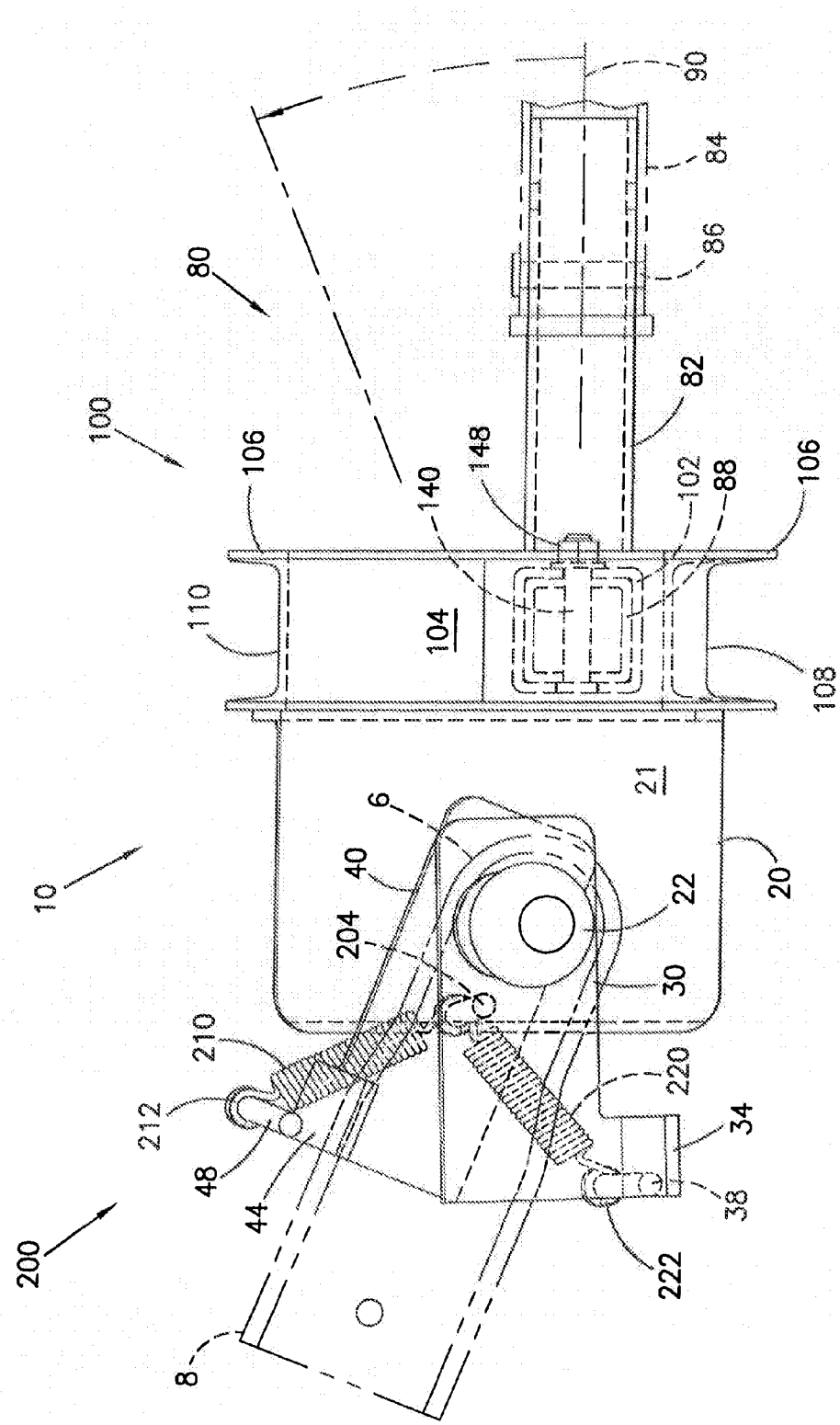
FIG. 13 is a top view similar to that of FIG. 12 of the trailer hitch of FIG. 1, with the base, universal pivot connector, and connection to the trailer tongue in a laterally offset position with respect to the attachment means as shown in FIG. 12, and with the trailer tongue rotated on the universal pivot connector, as during a turn of the towing vehicle and trailer, showing the rotational displacement of a pivot plate with respect to the universal pivot connector and base in such laterally offset position of the base and rotated position of the trailer tongue.

With the swing frame 100 pivotally connected to the sleeve 102, the base 20, which is attached to the swing frame 100, is suspended from the pivot axis formed by pivot pin 130. Thus, swing frame 100 can swing or pivot on the pivot pin 130 in order to move the base 20 and the hitch ball 22 laterally with respect to the towing vehicle, as shown in FIG. 4. As is apparent from FIG. 4, and as shown in FIGS. 12 and 13, as base 20 swings or pivots about pivot pin 130 to move base 20 and hitch ball 22 laterally, the base and hitch ball will also tip and move upwardly. However, with ball receiving socket 6 in place on hitch ball 22, hitch ball 22 can tilt and move in ball receiving socket 6 so that trailer tongue 8 remains in normal level position as shown in FIG. 4. The lateral movement of hitch ball 22 is the important movement of the invention, the tilting and vertical movement is merely incidental.

Figure 3:
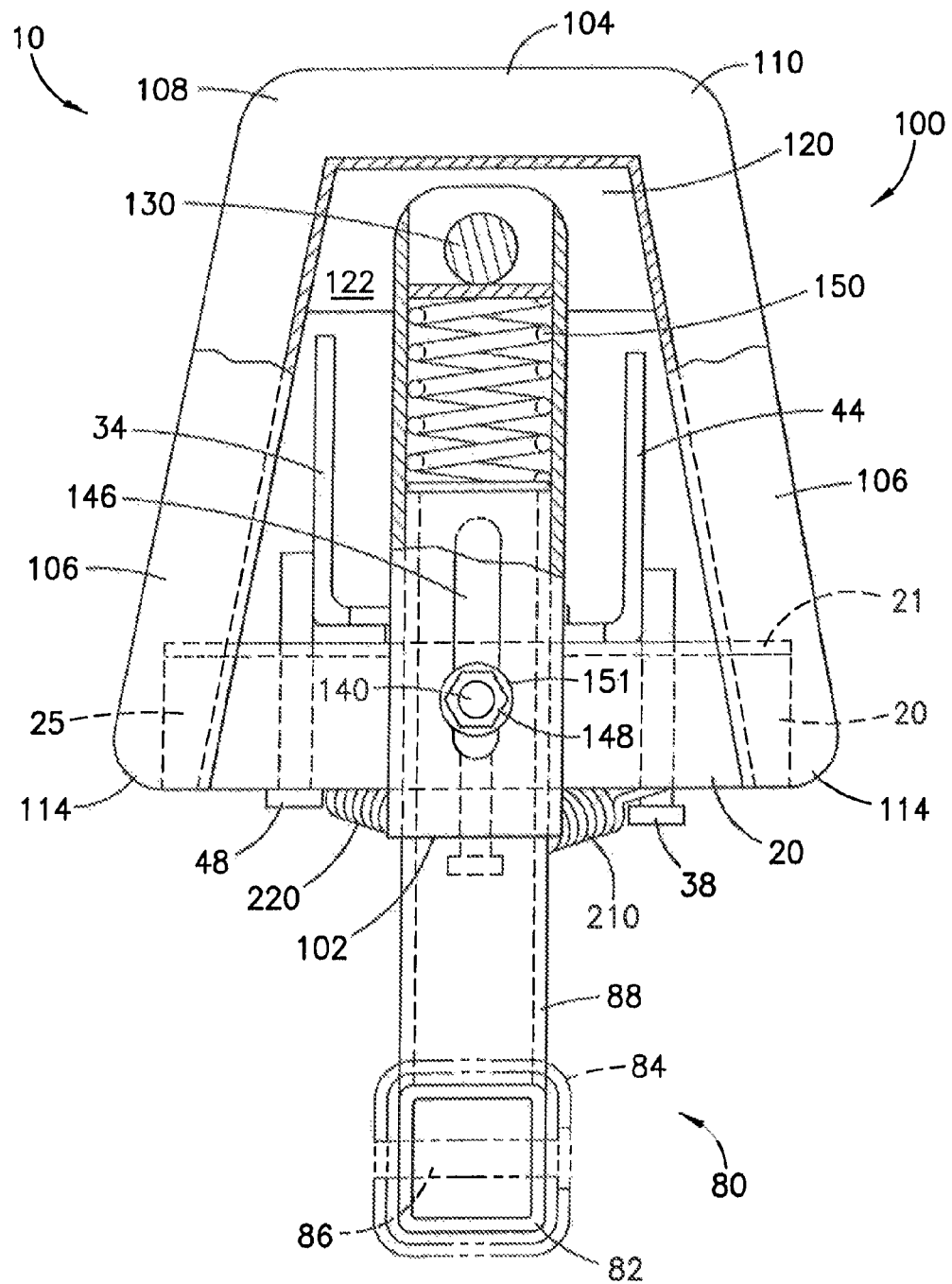
FIG. 3 is a front view of the trailer hitch of FIG. 1.

While swing frame 100 could be pivotally mounted at a fixed vertical position with respect to upwardly extending post 88, either by mounting frame 100 directly to upwardly extending post 88 without sleeve 102 or by adjusting sleeve 102 to an adjusted desired vertical position and fixing sleeve 102 to upwardly extending post 88 in order to adjust the vertical location of the hitch ball 22, it is currently preferred to allow dampening motion of the sleeve 102, mounting frame 100, and base 20 with hitch ball 22. This can be done, for example as best seen in FIGS. 1 and 3, by positioning a spring 150 in sleeve 102 between the top of upwardly extending post 88 and pivot pin 130. This allows telescoping dampening motion of sleeve 102 with respect to upwardly extending post 88 to allow such motion of the base 20 and hitch ball 22. Spring 150 will compress to some extent when the trailer tongue is attached to hitch ball 22, such depression depending upon the weight on the trailer tongue and the strength of the spring. Spring 150 will then compress and extend to allow and to act to dampen vertical displacement of the swing arm 100, and hitch ball 22, as the vehicle and trailer travel over bumps, depressions, and rough roads. Sleeve 102 is slidingly held in telescoped configuration over upwardly extending post 88 by bolt 140 extending through holes 142 in the upwardly extending post 88 and through slots 144 and 146, FIG. 3, in opposite sides of sleeve 102. A lock nut 148 and washer 151 are positioned on bolt 140 so that bolt 140 loosely fits through slots 144 and 146 in sleeve 102 to allow sleeve 102 to slide up and down on upwardly extending post 88, but not to separate from post 88. Slots 144 and 146 limit the allowed up and down motion. In the illustrated embodiment, shown best by FIG. 5, bolt head 152 of bolt 140 fits in slot 144 so it can slide in slot 144 while bolt 140 extends through slot 146 with locking nut 148 and washer 151 positioned outside of sleeve 102. Alternately, if fixed positioning is desired, nut 148 can be tightened against washer 151 and sleeve 102 to secure the sleeve in a desired vertical position on the upwardly extending post 88.

Swing frame 100 provides the trailer hitch 10 with several operational advantages. For example, the swinging motion of the swing frame 100 moves the base 20 and the hitch ball 22 laterally with respect to the towing vehicle. In this way, as the trailer is towed around a corner, or experiences lateral movement on the roadway due to wind, weight shifting, or bouncing, the swing frame 100 allows the hitch ball 22 to move laterally with respect to the towing vehicle to minimize the swaying effects of the lateral movement of the trailer. Lateral movement of the hitch ball 22 with respect to the towing vehicle provides the advantage of moving the effective pivot point of the hitch 10 toward the approximate center of the rear axle of the towing vehicle. In this way, the lateral movement of the swing frame 100 simulates the towing ability of a fifth wheel towing system where the hitch is mounted directly above the center of the axle of the towing vehicle.

A pair of overlapping pivot plates 30 and 40 rest on the upper surface 27 of base 20 and are mounted for pivotal rotation about hitch ball vertical axis 92. As previously indicated, hitch ball base 23 is spaced above upper base surface 27 by bushing 26 which surrounds ball hitch stud 24. This spacing is provided to allow pivot plates 30 and 40 to freely fit about bushing 26 between upper base surface 27 and hitch ball base 23 with bushing 26 passing through hole 32 through pivot plate 30 and hole 42 through pivot plate 40. Top pivot plate 30 includes a flange 34 on an outer edge 36 and bottom pivot plate 40 includes a flange 44 on an outer edge 46. The flanges 34 and 44 are configured to interact with the trailer tongue 8 when the trailer tongue 8 is in a mating position with the ball 22. In this way, as the trailer tongue 8 starts to pivot about the ball 22, trailer tongue 8 contacts and puts pressure on at least one of the flanges 34 or 44 to move the flange and the corresponding attached pivot plate with respect to the base 20.

Figure 2:
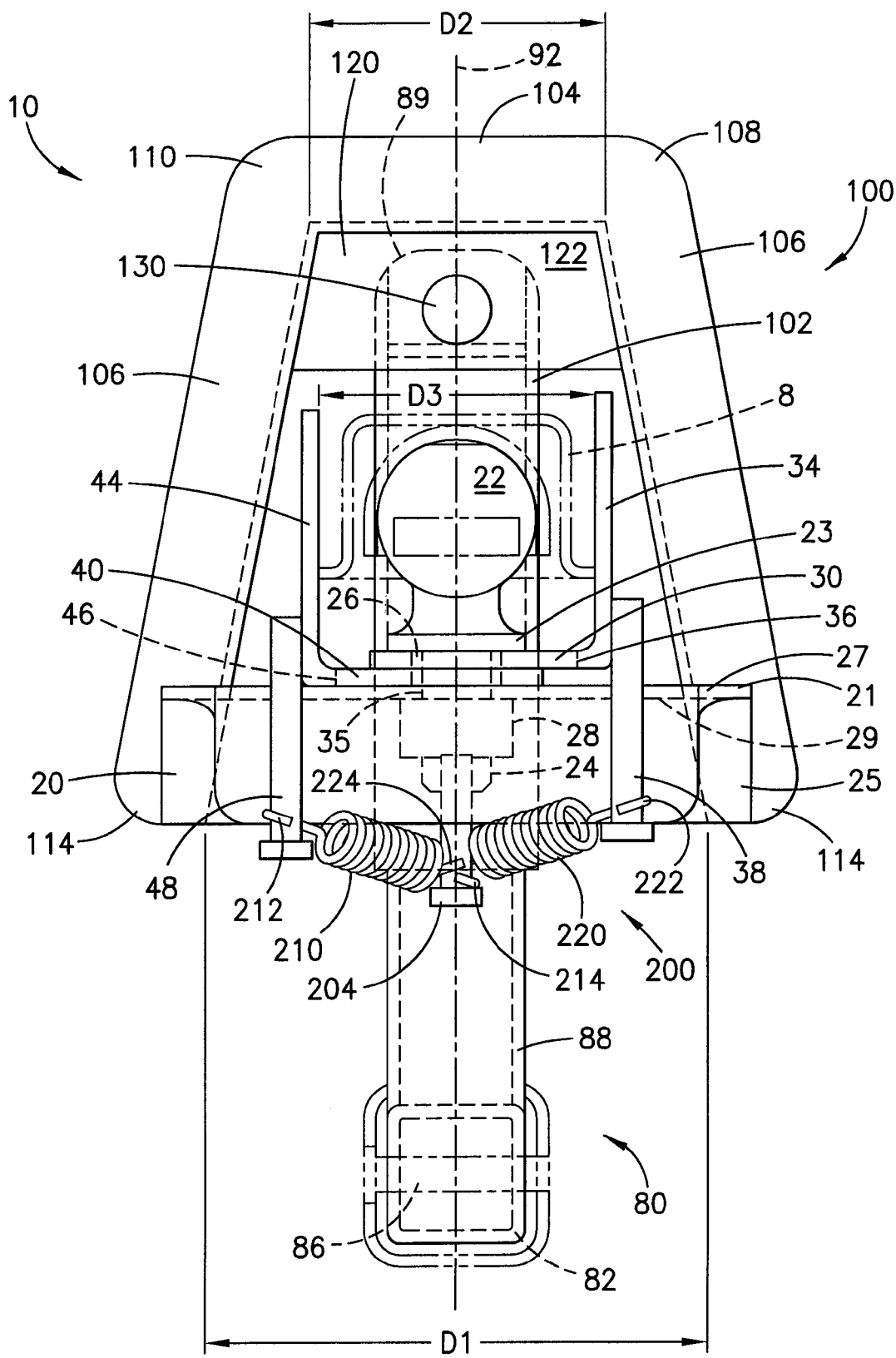
FIG. 2 is a rear view of the trailer hitch of FIG. 1.

The flanges 34 and 44 are substantially vertical and are coupled to an outer edge 36 and 46, respectively, of each of the pair of pivot plates 30 and 40, respectively. The substantially vertical flanges 34 and 44 are positioned with respect to one another such that a distance, shown at D3, FIG. 2, is formed between the flanges 34 and 44. The distance D3 is sized to receive the trailer tongue 8 when the trailer tongue is in a mating portion with the pivot connector or ball 22. The flanges 34 and 44 cause the pivot plates 30 and/or 40 to move or pivot with respect to the base 20 as the trailer tongue 8 pivots about the ball 22 and contacts and puts pressure on one of the flanges 34 or 44. Thus, with trailer tongue 8 received between side flanges 34 and 44, at least one of the pivot plates 30 or 40 will rotate with trailer tongue 8 about the ball 22 any time that the trailer tongue 8 rotates about the ball 22 when being towed. In this way, the pair of overlapping pivot plates 30 and 40 pivot about the universal pivot connector or ball 22 in coordination with the trailer tongue 8 when the trailer tongue is in a mating position with the pivot connector. This resulting movement of the pivot plates 30 or 40 may increase the distance D3 between the flanges 34 and 44 during rotation of trailer tongue 8 about ball 22.

Figure 6:
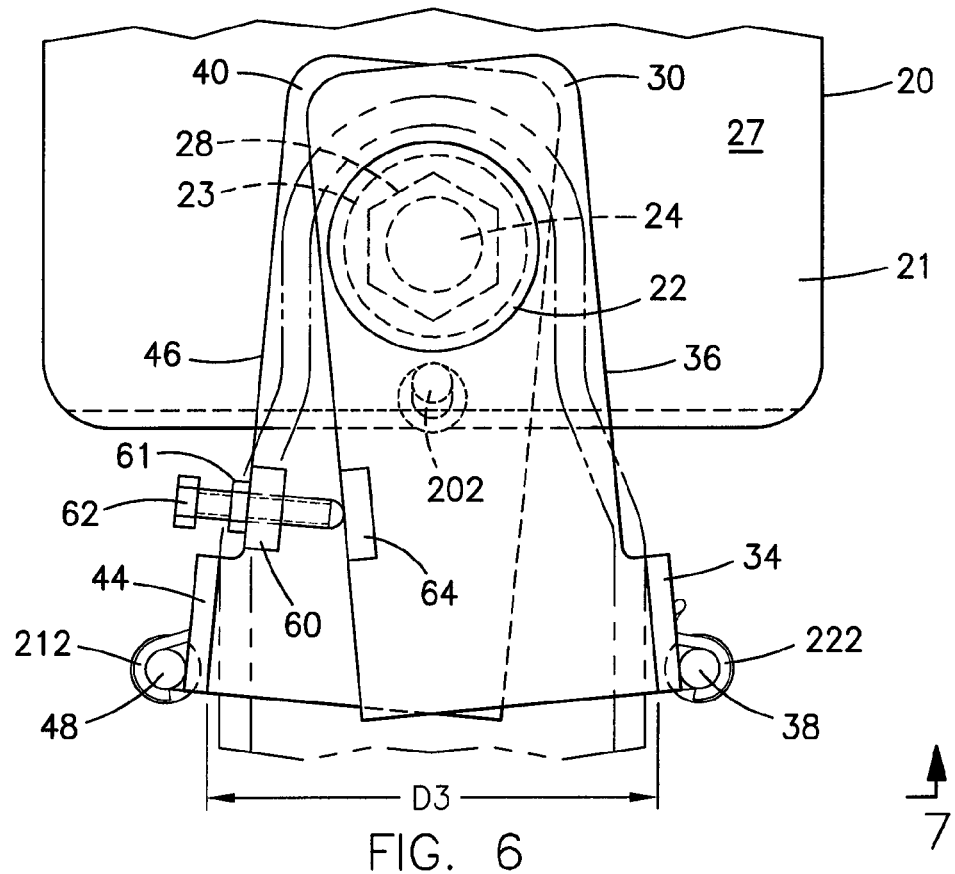
FIG. 6 is a fragmentary top view of the trailer hitch of FIG. 1, and showing a pair of flanges coupled to a pair of pivot plates in a spaced apart relation to one another on the base.
Figure 7:
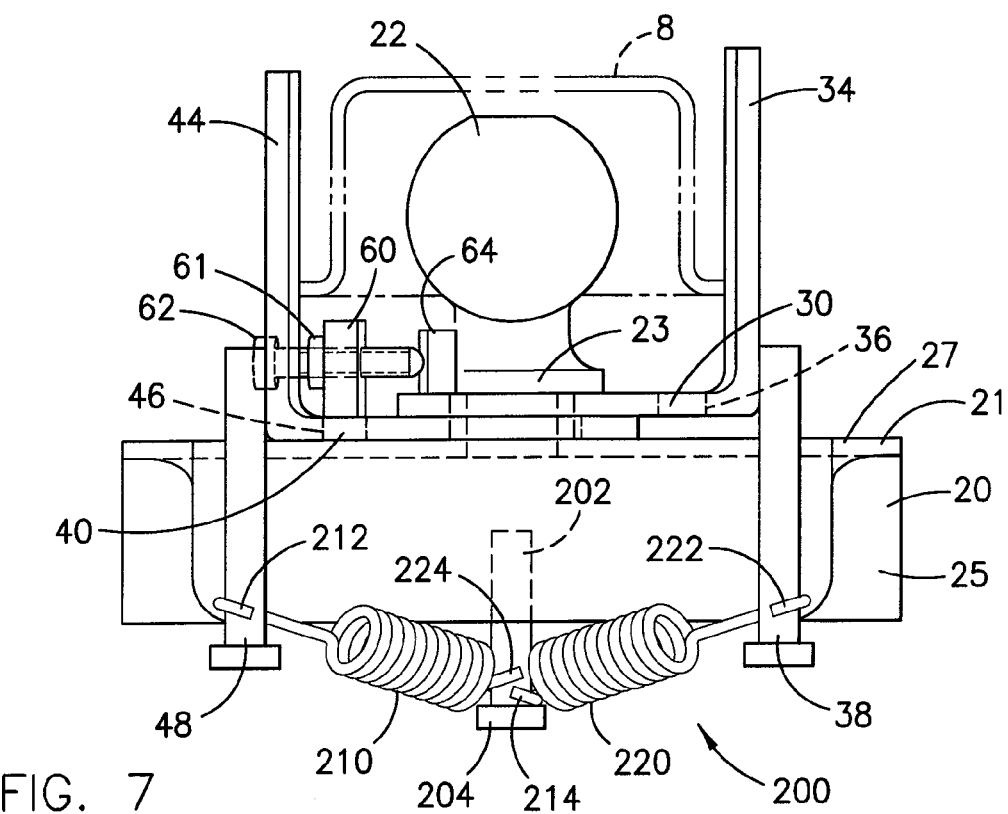
FIG. 7 is a fragmentary rear view of the base, pivot plates, and flanges of FIG. 6.

Referring to FIGS. 6 and 7, since trailer tongues may be of different widths, and since it is desirable to have the pivot plates 30 and 40 rotate with the tongue 8 without substantial free play while at the same time without continuously rubbing on the tongue, it may be desirable to be able to adjust the normal or minimum distance D3 between the flanges 34 and 44 that receives the trailer tongue 8. Various means to adjust the distance D3 and provide a relatively close fit of the trailer tongue between the flanges 34 and 44 can be used. For example, an adjusting device can include threaded adjusting block 60 (threads provided by a nut 61 secured, such as by welding, to block 60) attached to lower pivot plate 40 and a flat adjustment plate 64 attached to upper pivot plate 30. A screw or bolt 62 is threaded through adjusting block 60 with its end against adjustment plate 64. Screw or bolt 62 can then be turned to advance or retract bolt or screw 62 through adjusting block 60 to increase or decrease the distance between adjusting block 60 and adjusting plate 64 which determines the normal or minimum distance D3 between the flanges 34 and 44.

Additionally, a biasing device, indicated generally at 200, is coupled to the pivot plates 30 and 40 to bias or urge the pivot plates 30 and 40 to a centered position with respect to the base 20 as shown in FIGS. 1-4 and 6-12. It will be appreciated that it is usually desirable to provide a means for urging flanges 34 and 44 toward the center of the base 20 in order to ensure that the trailer tongue 8 will be urged to a centered position under all or most towing conditions. The biasing device 200 is coupled to each of the pair of overlapping pivot plates 30 and 40 to bias each of the pivot plates to a preset position, such as a centered position with respect to base 20. The biasing device 200 acts to resist rotation of the pivot plates 30 and 40 and the trailer tongue 8 away from the preset centered position.

The biasing device 200 includes a pair of springs 210 and 220. Each of the pair of springs 210 and 220 has a distal end and a proximal end. The distal end 212 of spring 210 is coupled to the pivot plate 40, and the distal end 222 of spring 220 is coupled to the pivot plate 30. In one aspect, the distal end 212 of the spring 210 is coupled to the flange 44 of the pivot plate 40 by a post 48 coupled to the flange 44. Similarly, the distal end 222 of the spring 220 is coupled to the flange 34 of the pivot plate 30 by another post 38 coupled to the flange 34.

The proximal ends 214 and 224 of the springs 210 and 220, respectively, are coupled to an attachment point 202 on the base 20. In one aspect, the attachment point 202 can be a common attachment point for both of the springs 210 and 220 and can be a post 204 coupled to a bracket 206 that is attached to the base 20. In another aspect (not shown), each spring can be attached to a different attachment point or post on the base.

Figure 11:
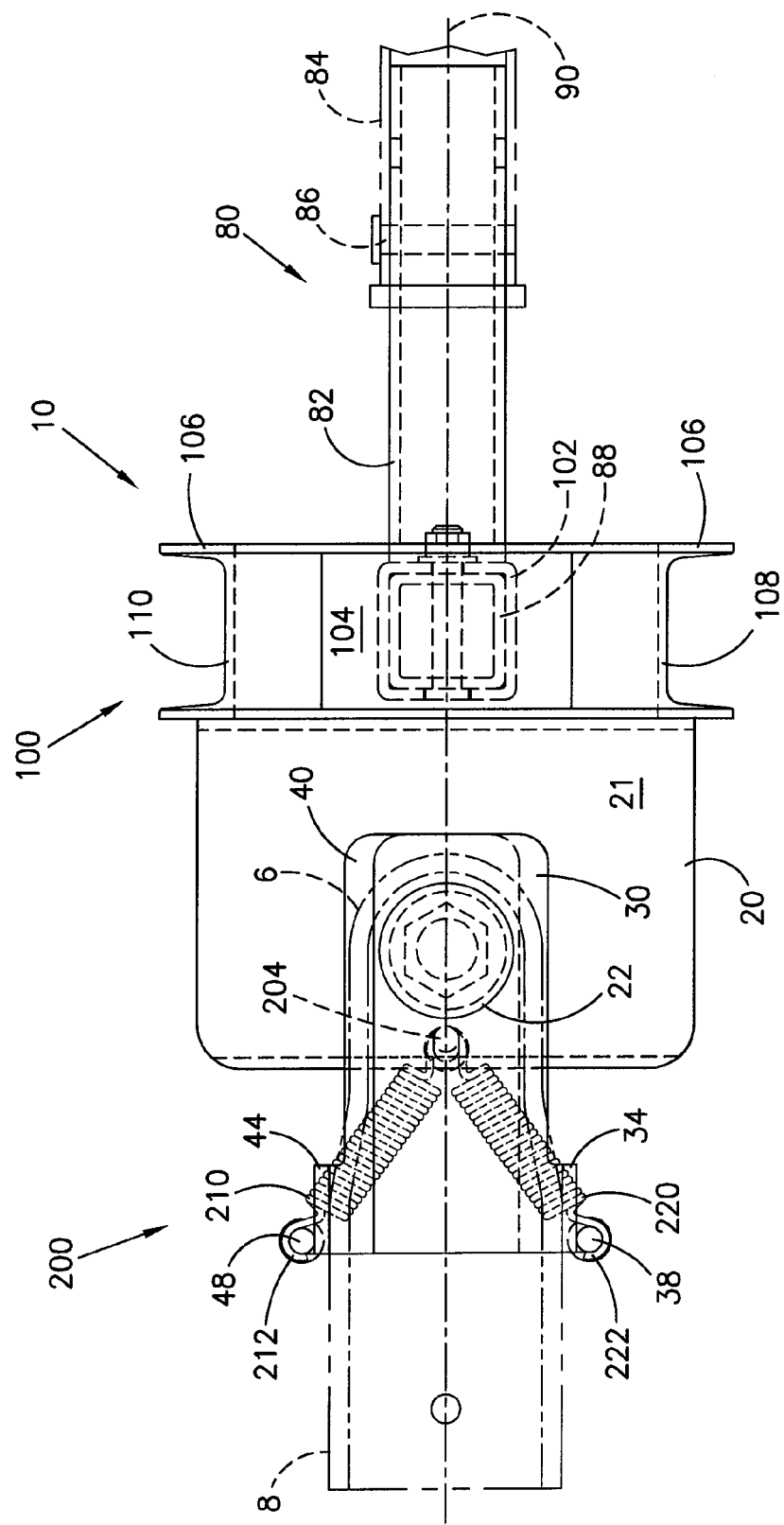
FIG. 11 is a top view of the trailer hitch of FIG. 1, shown in a normal straight forward towing position with the base, universal pivot connector, and connection to the trailer tongue in a centered position with respect to the attachment means and with the trailer tongue in a centered position with respect to the base.

With the springs 210 and 220 coupled between the pivot plates 30 and 40 and the base 20, the springs 210 and 220 act to resist rotation of the respective pivot plates away from the preset centered position. It will be appreciated that as the trailer tongue 8 rotates with respect to ball 22, tongue 8 will contact one of the flanges 34 or 44 and tongue 8 will exert a force on that flange to displace or rotate that flange and the pivot plate 30 or 40 from which it extends. As a pivot plate rotates, the spring 210 or 220 attached thereto will stretch and provide a resistive force back to the tongue 8 through the flanges 34 and 44. In this way, rotation of the tongue 8 on the ball 22 is resisted and tongue 8 is biased to a relatively centered position with respect to the base 20 until a sufficient force is applied by the tongue 8 on a flange 34 or 44 so as to overcome the resistive force of the spring 210 or 220, such as when the towing vehicle (not shown) pulls the trailer (not shown) through a turn. For example, as the towing vehicle tows the trailer through a turn of sufficient sharpness to cause the trailer tongue 8 to rotate on the hitch ball 22 so as to create an angle between tongue 8 and longitudinal center axis 90, trailer tongue 8 contacts one of the flange 34 or 44, depending upon the direction of the turn, and causes that flange and the pivot plate to which it is attached to rotate with respect to base 20 and attachment means 80 and to stretch the spring 210 or 220 attached to the rotating pivot plate. This stretch of spring 210 or 220 causes spring 210 or 220 to exert a force against the force of the trailer tongue 8 rotating flange 34 or 44 and pivot plate 30 or 40 and to return pivot plate 30 or 40 and flange 34 or 44 along with trailer tongue 8 to centered position when the rotational force is reduced below the force exerted by spring 210 or 220, such as when the rotational force is removed, as when the vehicle and trailer return to a straight towing configuration as shown in FIG. 11.

The resistive force provided by the biasing device, such as by spring 210 or 220, which will tend to keep the pivot plates in their preset, usually centered positions, will generally, when a turn is initiated or some other event occurs that would tend to rotate the trailer tongue 8 with respect to the hitch ball 22, such as a swaying of the trailer, resist rotation of the trailer tongue 8 on ball 22. Springs 210 and 220 will be chosen to provide enough resistance to rotation of tongue 8 on ball 22 so that it is easier for swing frame 100 to swing to move base 20 and hitch ball 22 laterally than it is to rotate a pivot plate 30 or 40. This means that hitch ball 22 will move laterally before tongue 8 will rotate with respect to hitch 22. This first lateral movement is important because it is during this lateral movement that the pivot point of the trailer with respect to the towing vehicle is effectively moved forwardly of the actual pivot point on ball 22 toward the rear axle of the towing vehicle to resist fishtailing of the trailer. Rotation of the trailer tongue 8 with respect to hitch ball 22 is prevented or significantly reduced during this lateral movement. Thus, the combination of pivot plates 30 and 40, flanges 34 and 44, and springs 210 and 220, along with the mounting of the base 20 and hitch ball 22 in swing frame 100, help to control sway and lateral movement of the towing vehicle due to sway, bouncing, and load shifting of the trailer during towing of the trailer by the towing vehicle.

Figure 9:
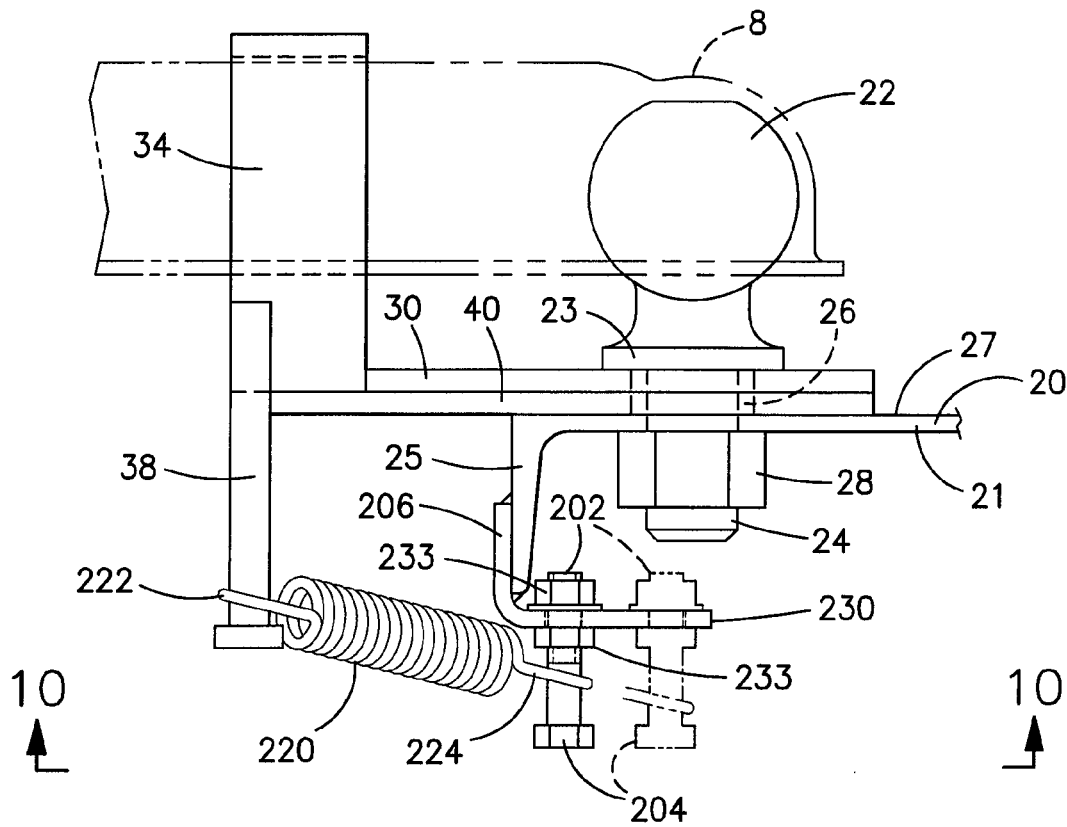
FIG. 9 is a fragmentary side view of the trailer hitch of FIG. 1, showing the base, hitch ball, pivot plates and flanges with a biasing device for maintaining the pivot plates in a centered position with respect to the base.
Figure 10:
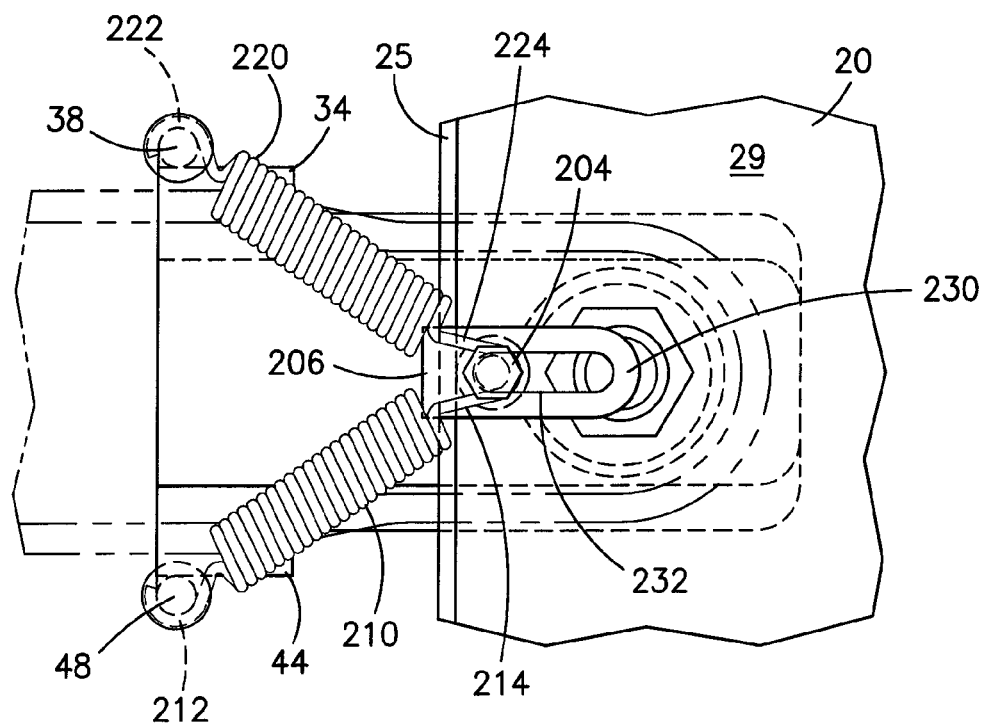
FIG. 10 is a fragmentary bottom view of the base and biasing device of FIG. 9.

Referring to FIGS. 9 and 10, the bracket 206 can include an attachment point adjustment plate 230 to allow adjustment of the attachment point 202 of the proximal ends of springs 110 and 120 in order to increase or decrease the tension in the springs 210 and 220. For example, the attachment point adjustment plate 230 has a plurality of longitudinal attachment point positions as provided by a slot 232 in which the post 204 can be positioned and secured. Thus, the post 204 can be selectably positioned longitudinally in the slot 232 so as to increase or decrease the tension in the springs 210 and 220. Increasing or decreasing the tension in the springs 210 and 220 can provide additional resistance or less resistance, as desired, to the rotation of pivot plates 30 and 40 and movement of flanges 34 and 44.

While the illustrated embodiment shows the biasing means as springs attached between respective pivot plates and the base so that movement of a pivot plate with respect to the base stretches the spring and movement of the pivot plates is allowed in any direction, various other spring arrangements or various other biasing means can be used. For example, another spring arrangement can be used if the pivot plates are limited to only one direction of movement from their centered position. In such arrangement, movement of one pivot plate with respect to the other pivot plate kept in centered position will increase the distance between portions of the pivot plates. In such case, a spring attached between the pivot plates would stretch when one pivot plate is moved by the trailer tongue and the stretching of the spring would bias the moving pivot plate against movement and bias the moving pivot plate back to its centered position.

Turning to FIGS. 11-13, in use, the attachment means 80 of the trailer hitch 10 is attached to the towing vehicle (not shown) by sliding the attachment bar 82 into the hitch receiver 84 of the towing vehicle and sliding and securing pin 86 into place to hold the attachment bar 82 in the hitch receiver 84. The distance D3 between the flanges 34 and 44 can be adjusted by turning the screw or bolt 62 in threaded adjusting block 60 to increase or decrease the distance D3 to the desired size that accommodates the width of the trailer tongue 8. The spring attachment point 202 can be adjusted by moving the attachment post 204 in slot 232 and securing the attachment post in position with a threaded block or nut 233 in order to increase or decrease the tension in the springs 210 and 220, as desired, depending on the trailer to be towed, type of road being traveled, and the load being carried by the trailer.

As shown in FIG. 11, a trailer (not shown) can then be attached to the hitch 10 by placing the ball socket 6 of the trailer tongue 8 onto the hitch ball 22. With the trailer tongue 8 attached to the hitch ball 22, the tongue 8 extends away from the towing vehicle between the flanges 34 and 44 so that any rotation of the trailer tongue 8 with respect to hitch ball 22 will cause a similar rotation of a corresponding pivot plate 30 or 40 with respect to base 20. As the trailer is pulled by the towing vehicle the trailer tongue 8 will tend to move and pivot about the hitch ball 22 depending on the road conditions, loading and sway of the trailer, wind resistance, and whether the towing vehicle is pulling the trailer through a turn. Such pivoting and turning motions of the trailer can cause the trailer tongue 8 to move in relation to the towing vehicle. Advantageously, the trailer hitch 10 responds to the trailer's motions by laterally moving the hitch ball 22 and by providing a resistive force against sway of the trailer tongue 8 by the flanges 34 and 44.

FIG. 11 shows the towing vehicle and trailer in straight alignment with trailer tongue 8 extending straight behind the towing vehicle along the longitudinal center axis 90 of the towing vehicle. With the trailer tongue 8 attached to the hitch ball 22, the tongue 8 extends away from the towing vehicle between the flanges 34 and 44. During towing of the trailer, even when being pulled straight ahead, the trailer can move and sway from wind conditions and road conditions which tends to put lateral and/or rotational pressure on the tongue 8 with respect to ball 22. With the normal trailer hitch, this lateral and/or rotational pressure will tend to cause the rear end of the towing vehicle to move and sway, sometimes resulting in fishtailing and loss of control of the towing vehicle. With the hitch of the invention, any lateral pressure applied by the trailer tongue will initially tend to move the hitch ball laterally as such lateral movement is allowed by the mounting of the hitch ball and the base according to the invention. This will allow some lateral movement without putting undue pressure on the towing vehicle, thereby maintaining the stability of the towing vehicle. Further, when pressure is applied by the trailer tongue which tends to rotate the trailer tongue with respect to ball 22, rotation of the tongue with respect to the ball will be resisted by the bias of the flanges 34 or 44. Thus, initial rotational pressure will be applied to either flange 34 or 44 and the resistance to rotation of the flanges caused by the bias of the flanges will convert this initial rotational force to lateral movement of the base and hitch ball, thereby moving the effective point of rotation forwardly of the hitch ball toward the towing vehicle rear axle, again providing more stability to the towing vehicle.

Since usually the trailer will put weight on the trailer tongue 8 tending to push the end of the trailer tongue attached to the hitch ball downwardly, and since lateral movement of the hitch ball through swinging of the swing frame 100 will vertically raise the hitch ball and attached trailer tongue, the swing frame 100 will generally be biased by gravity from the weight of the swing arm and by weight on the trailer tongue to its lowest vertical position which is the centered position shown in FIG. 11.

While FIG. 11 shows the trailer tongue 8 and hitch ball 22 centered with the vehicle longitudinal center axis 90, FIG. 12 shows the trailer tongue 8 and hitch ball 22 moved laterally to the left of the center axis 90. This leftward lateral movement of hitch ball 22 is allowed by the swing to the left of the swing frame 100 as shown in FIG. 4. It can be seen in FIG. 4 that in this position base 20, flanges 34 and 44, and hitch ball 22 are at an angle to the vertical axis 92 of the hitch. This angular orientation of base 20, hitch ball 22, and flanges 34 and 44 is shown in FIG. 12 which is a top plan view of the hitch, not a top plan view of the base 20, flanges 34 and 44, and hitch ball 22. FIGS. 5 and 12 shows hitch ball 22 at about the extreme of its allowed movement to the left of the center axis. Further rotational force applied between trailer tongue 8 and hitch ball 22 will result in rotational movement of trailer tongue 8 on hitch ball 22. The result of rotational movement of trailer tongue 8 to the left on hitch ball 22 is shown in FIG. 13. As shown, trailer tongue 8 has contacted flange 44 and forced flange 44 and pivot plate 40 to rotate to the left on base 20 against the bias of spring 210. This causes spring 210 to stretch. The stretch of spring 210 is difficult to see in FIG. 13 because of the angle of the base and spring in FIG. 13. As the vehicle and trailer straighten out from the position shown in FIG. 13, spring 210 will tend to cause return to the position of FIG. 12 before moving back to the position of FIG. 11. Thus, for example, as the towing vehicle and trailer are traveling straight on a smooth flat road in still weather conditions, the hitch of the invention will generally be in a position as shown in FIG. 11. As the towing vehicle begins a turn to the left, the hitch will move from the position of FIG. 11 toward the position of FIG. 12. For wide curves such as most curves on interstate highways, the hitch will probably not move beyond the position shown in FIG. 12. However, as the towing vehicle and trailer encounter sharper turns, the turn radius accommodated by the lateral movement allowed in the trailer hitch is exceeded and the tongue will turn toward, and in sharper turns exceed, the position shown in FIG. 13 where the trailer tongue has caused rotation of the pivot plate. As the towing vehicle straightens out, the trailer hitch will move back from a position as shown in FIG. 13 to the position shown in FIG. 12, and back to the position shown in FIG. 11.

Where sharper turns are encountered, such as in parking or otherwise maneuvering the trailer, rotation of the pivot plates 30 or 40 with respect to base 20 can result in flanges 34 or 44 moving the pivot plates 30 or 40, respectively. However, as normal towing of the trailer resumes, the towing vehicle and trailer will straighten out and the pivot plates 30 or 40 will move to centered position with regard to base 20 and operate as described above for normal towing with the bias toward keeping the pivot plate, and thus the trailer tongue 8, in centered relationship with the base 20, and with most turning being accommodated by the lateral movement of the base 20 by the swing frame 100.

While in normal towing of the trailer it is desired that initially during a turn the base 20 move by the swing frame 100 to its limit of lateral movement before the trailer tongue 8 causes the flanges 34 or 44 to pivot or rotate the pivot plates 30 or 40 with respect to base 20, in some situations it may be desirable to limit swinging of the swing frame 100, such as during backing up. In such situations, it may be desirable to limit lateral movement of the base 20 by the swing frame 100, and instead, to maintain the base 20 in a centered position with respect to the towing vehicle. In this case a lock (not shown) can be secured on the swing frame 100 to restrict the lateral motion of the base 20.

While the trailer hitch of the invention has been shown and described with regard to the specific embodiment using swing frame 100 pivoted from a single pivot axis centered with respect to the hitch, various other arrangements can be used. For example, base 20 can be suspended by a pair of links pivotally attached to a pair of pivot axes spaced laterally from the central hitch axis. In such case, the base will remain substantially horizontal as it moves laterally with respect to the attachment means rather than tipping at an angle as in the illustrated embodiment.

It is to be understood that the above-referenced arrangements are only illustrative of the application for the principles of the present invention. Numerous modifications and alternative arrangements can be devised without departing from the spirit and scope of the present invention. While the present invention has been shown in the drawings and fully described above with particularity and detail in connection with what is presently deemed to be the most practical and preferred embodiment(s) of the invention, it will be apparent to those of ordinary skill in the art that numerous modifications can be made without departing from the principles and concepts of the invention as set forth herein.

What is claimed is:

1. A trailer hitch for a vehicle comprising:
 a) attachment means for attaching the hitch to a vehicle;
 b) a base mounted on the attachment means;
 c) a universal pivot connector having a vertical axis secured to the base for mating connection to a tongue of a trailer to be connected to the vehicle;
 d) a pair of overlapping pivot plates comprising a top pivot plate and a bottom pivot plate, wherein the top pivot plate and the bottom pivot plate are overlapping and mounted to pivot about the vertical axis of the universal pivot connector in coordination with the trailer tongue when the trailer tongue is in a mating position with the pivot connector, each of the pivot plates further comprising:
  i) a flange on each of the pair of pivot plates to interact with the trailer tongue when the trailer tongue is in a mating position with the universal pivot connector such that as the trailer tongue pivots about the universal pivot connector the trailer tongue contacts at least one of the flanges to move at least one of the pivot plates with respect to the attachment means; and
  ii) a biasing device coupled to each of the pair of overlapping pivot plates to bias each of the pivot plates to a preset position with respect to the base and to resist rotation of the pivot plates and trailer tongue away from the preset position.

2. A trailer hitch for a vehicle according to claim 1, wherein:
 the flanges are substantially vertical flanges on an outer edge of each of the pair of pivot plates, with a space between the substantially vertical flanges sized to receive the trailer tongue therein when the trailer tongue is in a mating portion with the pivot connector; and
 wherein the at least one pivot plate that moves as the trailer tongue pivots about the universal pivot connector moves to increase the space between the flanges.

3. A trailer hitch for a vehicle according to claim 2, further including an adjustment device for adjusting the space between the substantially vertical flanges in which the trailer tongue is received.

4. A trailer hitch for a vehicle according to claim 1, wherein:
 a) the base is suspended from the attachment means to allow lateral movement of the base with respect to the attachment means; and
 b) the universal pivot connector extends upward from the base to provide a mating connection for the trailer tongue and moves with the base.

5. A trailer hitch for a vehicle according to claim 4, wherein the base is suspended from at least one pivot axis supported by the attachment means.

6. A trailer hitch for a vehicle according to claim 5, wherein the attachment means has a central axis, and the at least one pivot axis is parallel to the attachment means central axis.

7. A trailer hitch for a vehicle according to claim 1, wherein the biasing device includes a pair of springs with each spring further comprising:
 a) a distal end coupled to a different one of the pair of overlapping pivot plates; and
 b) a proximal end coupled to an attachment point such that each spring resists rotation away from the preset position of the attached pivot plate when the trailer tongue contacts the flange of the pivot plate.

8. A trailer hitch for a vehicle according to claim 7, wherein the attachment point on the base is a common attachment point on the base for the proximal end of each of the pair of springs.

9. A trailer hitch for a vehicle according to claim 7, wherein the distal end of each spring is coupled to the flange of a different one of the pair of pivot plates.

10. A trailer hitch in accordance with claim 7, further comprising an attachment point adjustment plate coupled to the base and having a plurality of attachment point positions such that the attachment point is selectably positionable in one of the plurality of attachment point positions to increase or decrease the tension in the spring thereby increasing or decreasing the size of the space between the flanges.

11. A trailer hitch for a vehicle comprising:
 a) attachment means for attaching the hitch to a vehicle;
 b) a base suspended from the attachment means to allow lateral movement of the base with respect to the attachment means;
 c) a universal pivot connector extending upward from the base having a vertical axis to provide a mating connection for a trailer tongue that moves with the base;
 d) a pair of overlapping pivot plates comprising a top pivot plate and a bottom pivot plate, wherein the top pivot plate and the bottom pivot plate are overlapping and mounted to pivot about the vertical axis of the universal pivot connector; and
 e) biasing means for biasing the base to a preset lateral position.

12. A trailer hitch for a vehicle according to claim 11, wherein the biasing means includes:
 a) the pair of overlapping pivot plates mounted to pivot about the universal pivot connector in coordination with the trailer tongue when the trailer tongue is in a mating position with the pivot connector, each of the pivot plates further comprising:
  i) a flange on each of the pair of pivot plates to interact with the trailer tongue when the trailer tongue is in a mating position with the universal pivot connector such that as the trailer tongue pivots about the universal pivot connector the trailer tongue contacts at least one of the flanges to move at least one of the pivot plates with respect to the attachment means; and
  ii) a biasing device coupled to each of the pair of overlapping pivot plates to bias each of the pivot plates to the preset position with respect to the base and to resist rotation of the pivot plates and trailer tongue away from the preset position.

13. A trailer hitch for a vehicle according to claim 12, wherein the flanges are spaced apart to receive the trailer tongue in a space between the flanges, and further including an adjustment device for adjusting the space between the flanges in which the trailer tongue is received.

14. A trailer hitch for a vehicle according to claim 11, the attachment means further comprising:
  a) a receiver bar sized and shaped to fit within a receiver hitch on the vehicle; and
  b) a post coupled to the receiver bar and extending upward therefrom, the post being sized and shaped to support the suspended base in a position elevated above the receiver bar.

15. A trailer hitch for a vehicle according to claim 14, wherein the suspended base includes:
  a) a telescoping sleeve sized and shaped to fit on the upwardly extending post on the attachment means, the sleeve being positionable in a desired elevational position with respect to the receiver bar; and
  b) a locking mechanism configured to secure the telescoping sleeve in the desired elevational position.

16. A trailer hitch for a vehicle according to claim 15, further comprising:
  a) a shock absorbing device operatively coupled between the telescoping sleeve and the post and configured to dampen vertical displacement of the telescoping sleeve with respect to the vertical post to reduce trailer bounce.

17. A trailer hitch in accordance with claim 16, wherein the shock absorbing device is an adjustable spring coupled between the sleeve and the post, and adjustable to increase or decrease tension on the spring to increase or decrease dampening of the vertical displacement of the sleeve with respect to the vertical post.

18. A trailer hitch for a vehicle according to claim 11, wherein the biasing means includes suspending the base from the attachment means in a manner so that the base has a preset suspended rest position when the trailer hitch is attached to a vehicle, and so that the allowed lateral movement of the base also produces simultaneous upward vertical movement as the base is moved laterally with respect to the attachment means from the preset suspended rest position.

19. A trailer hitch for a vehicle according to claim 18, wherein the base is suspended from a pivot attachment above the base to the attachment means whereby the base moves in an arc about the pivot attachment as the base moves laterally from the suspended rest position.

20. A trailer hitch for a vehicle comprising:
  a) attachment means for attaching the hitch to a vehicle;
  b) a base suspended from the attachment means to allow lateral movement of the base with respect to the attachment means;
  c) a universal pivot connector extending upward from the base having a vertical axis to provide a mating connection for a trailer tongue that moves with the base; and
  d) a pair of overlapping pivot plates comprising a top pivot plate and a bottom pivot plate, wherein the top pivot plate and the bottom pivot plate are overlapping and mounted to pivot about the vertical axis of the universal pivot connector in coordination with the trailer tongue when the trailer tongue is in a mating position with the pivot connector, each of the pivot plates further comprising:
    i) a flange on each of the pair of pivot plates to interact with the trailer tongue when the trailer tongue is in a mating position with the universal pivot connector such that as the trailer tongue pivots about the universal pivot connector the trailer tongue contacts at least one of the flanges to move at least one of the pivot plates with respect to the attachment means; and
    ii) a biasing device coupled to each of the pair of overlapping pivot plates to bias each of the pivot plates to a preset position with respect to the base and to resist rotation of the pivot plates and trailer tongue away from the preset position.

* * * * *